(No Model.)
2 Sheets—Sheet 1.

D. B. MATLOCK.
GATE.

No. 294,649. Patented Mar. 4, 1884.

WITNESSES
Franck L. Ourand.
J. W. Lowe.

INVENTOR
D. B. Matlock.
by A. G. Heylmun,
Attorney.

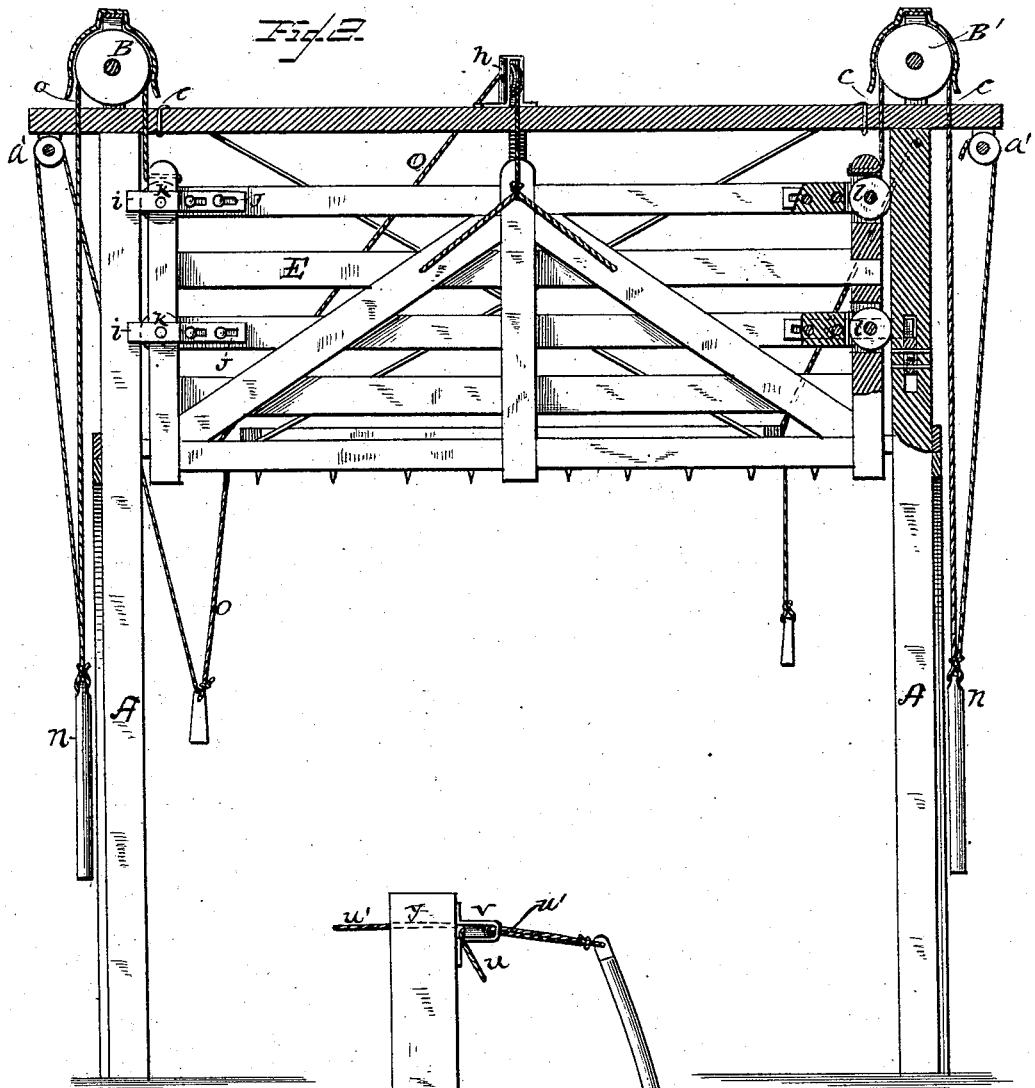

UNITED STATES PATENT OFFICE.

DAVID B. MATLOCK, OF RED BLUFF, CALIFORNIA.

GATE.

SPECIFICATION forming part of Letters Patent No. 294,649, dated March 4, 1884.

Application filed August 17, 1883. (No model.)

*To all whom it may concern:*

Be it known that I, DAVID B. MATLOCK, a citizen of the United States of America, residing at Red Bluff, in the county of Tehama and State of California, have invented certain new and useful Improvements in Gates; and I do hereby declare the following to be a full, clear, and exact description of the invention, such as will enable others skilled in the art to which it appertains to make and use the same.

My invention appertains to improvements in gates of that class wherein the passage is opened and closed by the vertical movement of the gate.

It is the object of my invention to construct a gate of the kind named which can be readily and easily raised from a closed position or closed from a raised position by a person in a road-vehicle or on horseback without getting out of the vehicle or dismounting.

My improvements therefore consist in providing the gate with guide-plates carrying friction-rollers operating against the side posts, in combination with latching means, as hereinafter set forth.

My improvements further consist in an improved latch whereby the gate is certainly latched and securely held in a raised position.

My improvements also consist in the novel construction and combination of parts, as will be hereinafter more fully described and specifically claimed.

Figure 1:
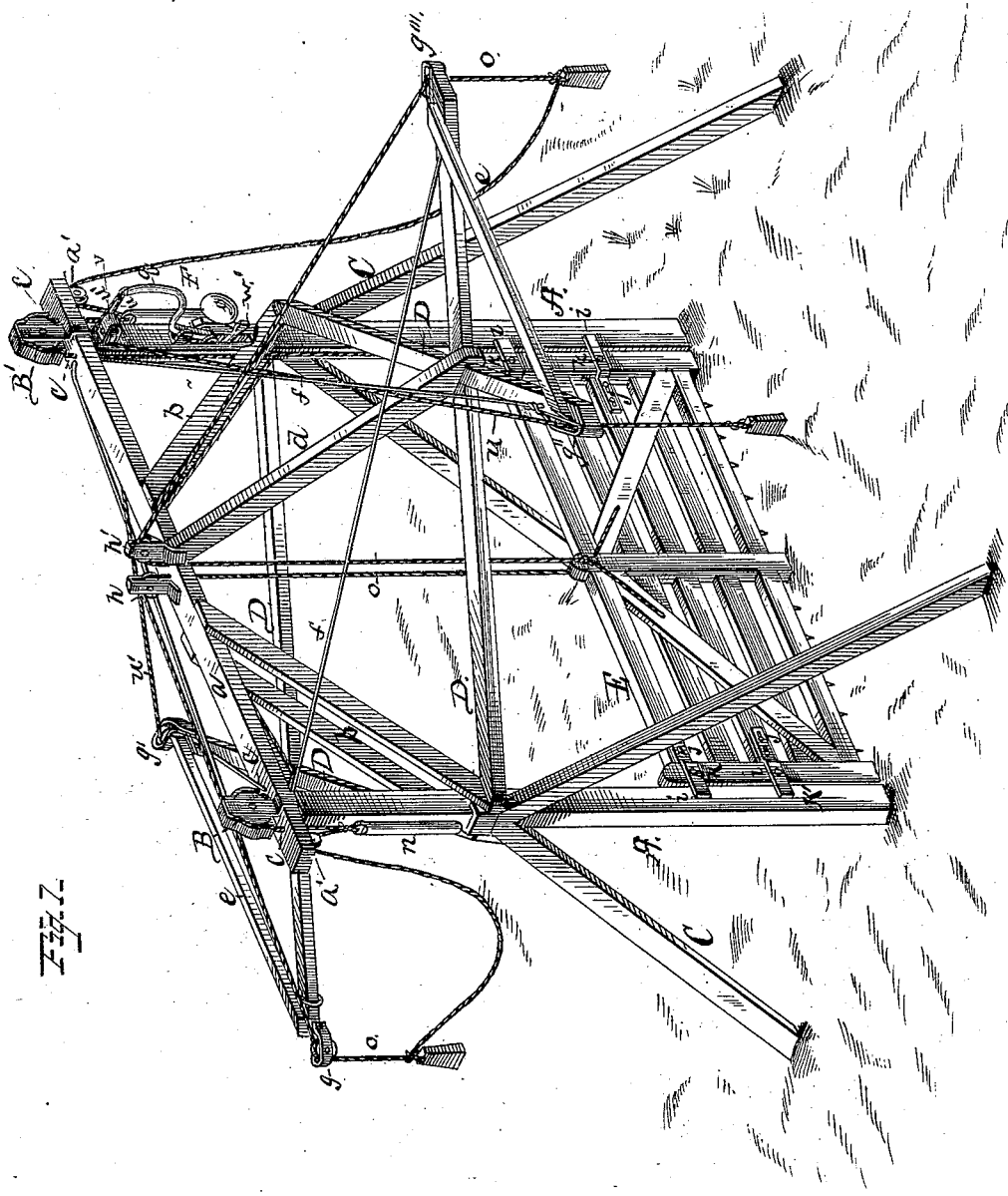
Figure 4:
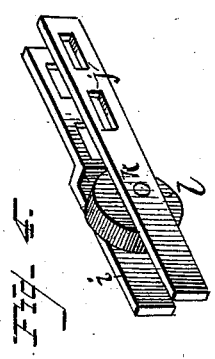

In the accompanying drawings, forming a part of this specification, Figure 1 is a perspective view of my improved gate. Fig. 2 is a view showing a section of the gate with the friction-rollers and latch projections. Fig. 3 is a view of the latch and alarm, and Fig. 4 is a view of the slotted guides and friction-rollers.

The letter A represents the uprights, connected at the top by a substantial cross-tie, $a$, and further stiffened and secured by the angle-braces $b$. In the cross-tie, on a line with the fall of the gate and the weights, are formed mortises or holes $c$, for receiving the cords which sustain the gate in suspension; and on the cross-tie, preferably over the uprights and between the holes for the cords, are secured the groove cord-pulleys B and B'. The angle-braces C at the base of the frame are secured at their upper ends to the uprights by any suitable means.

The letter D represents cross-bars which have one end fastened to the upright, and from thence extending, cross each other, and, reach from the uprights far enough to serve the purpose of carrying the cords a distance from the gate sufficient to permit the team to stand between the gate and the operator in the wagon or other vehicle. Secured to the center of the cross-tie of the frame, on each side, are the braces $d$, the other end of which is secured to the cross-bars D at the place where they meet and cross each other. The ends of the cross-bars D are connected and further strengthened by a bar, $e$, substantially as shown, and these frames are further secured and braced by the metallic rods $f$, secured to the main cross-tie of the frame at near the upright, and from that point extending, having their other end secured to the ends of the cross-bars. To the ends of the cross-bars D are secured grooved pulleys $g$, $g'$, $g''$, and $g'''$, and in the center of the cross-tie $a$ are fixed the pulleys $h$ and $h'$, over which are passed the cords which lift the gate.

The letter E represents the gate, which may be of any suitable construction, so far as the frame-work is concerned. To the end slats or bars of this gate are bolted the guide-plates $i$, formed with slotted bolt-holes $j$, for the purpose hereinafter stated, and having journal-holes $k$, in which the journals of the friction-wheels $l$ journal. These friction-wheels are placed, as shown, between these guides, and bear with their faces against the faces of the posts. By means of the slots in the guide-plates the friction-wheels may be adjusted to accommodate any swell or shrinkage of the gate or frame. It will be seen by reference to the drawings that the guide-plates are of unequal lengths, one shorter than the other. The longer one is intended to extend far enough across the face of the upright to certainly engage with the latch, and the shorter one is made of such length that in the ascent or descent of the gate it will not encounter any obstacle in its course. These guides also keep the gate in a vertical position, and, as intimated, the longer one acts as the means for holding the gate when in contact with the latch—that is, the upper one secures the gate in the lower position and the lower one in a higher position. The gate is supplied with the common cords and weights $n$, the cords being passed over the pulleys on the upright, and having suspended weights attached lighter than the gate. To the center of the gate are attached the lifting or hand cords $o$, which pass from the point of suspension up through holes in the cross-tie over the pulleys $h$ and $h'$, and from thence over the pulleys $g$ and $g'''$, and have small weights attached to them sufficient to hold them in position. These cords are disposed, respectively, to the right hand in the direction of travel, for obvious reasons.

The letter F represents my improved alarm and means for securing the gate at a fixed height. In one of the uprights is cut a slot, $p$, (see Fig. 3,) of suitable width and length, for the purpose of receiving the alarm and latch-lever. In this device the letter $q$ represents the actuating-lever journaled to its fulcrum $r$, fixed in the upright, preferably formed with the bow shape shown, and having pivotally attached its lower arm the latch $s$, which rests on a bar or pin, $t$, passed through the slot in the post, in such position that the free end of the latch cannot be drawn back past the pin $t$ or fall from its line of engagement with the gate. To the end of the bent arm of the lever are attached the cords $u$ $u'$, one of which, $u'$, passes through a hole, $y$, in the upright, and from thence to the pulley $g''$, and the other, $u$, passes about a grooved pulley, $v$, and from thence to the pulley $g''$, as shown. In order to assure prompt action in the movement of the latch after the gate has passed in descending, a weight, $w$, may be attached to the bent arm of the lever, substantially as shown in Fig. 3.

The letter H represents the alarm, which consists of the bell fixed to the upright, and the clapper $w'$, journaled to a rod passed through the slot, and so disposed and adjusted that when the gate, in its upward passage, lifts the latch and passes from contact therewith the latch, in falling back, strikes the end of the clapper and drives it against the bell, which is a signal that the gate has passed above the latch and will drop and rest thereon when the hand is released from the cord.

To set the gate in position, the upright may be set in the ground or securely bolted to posts set in the ground, and the angle-braces at the base similarly secured or set.

In order to take up the slack in the lifting-cords and prevent them from getting in the dirt and mud, I extend the cords from the point of the hand-grasp to pulley $a'$, placed near where the cord of the large weights is attached, and from thence to the large weight, and there fasten the end. It will thus be seen that the downward movement of the gate-weight takes up the slack.

The operation of my gate is as follows: The person approaching the gate takes hold of the cord $o$ on his right hand, which is the lifting-cord, and pulls down, which action is continued until the gate is drawn above the latch, which may be known by the signal of the bell. The gate is then in position to admit of the passage of the vehicle or horse. After passing through, the cord $u$ or $u'$ on the right—being the one connected from that side with the end of the latch-lever—is pulled, which withdraws the bar of the latch from contact with the guide, and the gate by its own weight descends.

To prevent hogs or other animals from raising the gate, I stretch a barb-wire beneath the bottom rail of the gate or supply it with pointed spikes in the lower rail.

What I claim as my invention, and desire to secure by Letters Patent, is—

1. In combination with the vertical sliding gate provided with guide-plates of unequal lengths, the longer of which is adapted to engage with a locking means, the locking-lever pivotally attached in the uprights of the gate-frame, substantially as described.

2. In combination with a vertical gate having extended guide-plates, the latch consisting of the lever $q$ and latch-bar $s$, substantially as described.

3. In combination with a vertical sliding gate having extended guide-plate, the latch consisting of the lever $q$ and latch-bar $s$, and signal lever and bell, substantially as described.

4. In combination with a vertical sliding gate having extended guide-plates, and carrying friction-wheels journaled therein, the latch consisting of the lever $q$ and latch-bar $s$, substantially as described.

5. In combination with a vertical sliding gate having adjustable extending guide-plates carrying friction-wheels journaled thereon, the latch consisting of the lever $q$ and latch-bar $s$, substantially as described.

6. In combination with the hand-cord $o$, a cord secured thereto and connected with the cord or weight to draw up the gate, substantially as and for the purposes set forth.

In testimony whereof I affix my signature in presence of two witnesses.

DAVID B. MATLOCK.

Witnesses:
W. C. WILSON,
E. M. HILLIARD.